United States Patent
Ramanarayanan et al.

(10) Patent No.: US 8,214,414 B2
(45) Date of Patent: Jul. 3, 2012

(54) COMBINED SET BIT COUNT AND DETECTOR LOGIC

(75) Inventors: Rajaraman Ramanarayanan, Hillsboro, OR (US); Sanu K. Mathew, Hillsboro, OR (US); Ram K. Krishnamurthy, Portland, OR (US); Shay Gueron, Haifa (IL); Vasantha K. Erraguntla, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 946 days.

(21) Appl. No.: 12/242,727

(22) Filed: Sep. 30, 2008

(65) Prior Publication Data

US 2010/0082718 A1    Apr. 1, 2010

(51) Int. Cl.
*G06F 15/00*    (2006.01)
(52) U.S. Cl. ........................ 708/210; 708/211
(58) Field of Classification Search ............... 708/210, 708/211
See application file for complete search history.

(56) References Cited

U.S. PATENT DOCUMENTS

| 7,075,462 | B2 * | 7/2006 | Sudharsanan | 341/67 |
| 2001/0037349 | A1 * | 11/2001 | Hayakawa | 708/211 |
| 2002/0111976 | A1 * | 8/2002 | Hossain | 708/200 |
| 2005/0289203 | A1 * | 12/2005 | Breternitz et al. | 708/160 |

* cited by examiner

*Primary Examiner* — Chuong D Ngo
(74) *Attorney, Agent, or Firm* — Blakely, Sokoloff, Taylor & Zafman LLP

(57) ABSTRACT

A merged datapath for PopCount and BitScan is described. A hardware circuit includes a compressor tree utilized for a PopCount function, which is reused by a BitScan function (e.g., bit scan forward (BSF) or bit scan reverse (BSR)). Selector logic enables the compressor tree to operate on an input word for the PopCount or BitScan operation, based on a microprocessor instruction. The input word is encoded if a BitScan operation is selected. The compressor tree receives the input word, operates on the bits as though all bits have same level of significance (e.g., for an N-bit input word, the input word is treated as N one-bit inputs). The result of the compressor tree circuit is a binary value representing a number related to the operation performed (the number of set bits for PopCount, or the bit position of the first set bit encountered by scanning the input word).

20 Claims, 8 Drawing Sheets

510

520

530

600

64-BIT INPUT

| 010110 | 000000 | 000000 | 000000 | 000010 | 000000 | 000000 | 001000 | 000100 | 000000 | 0000 |

6-BIT ENCODING: POSITION
OF FIRST '1' = NUMBER OF
'1's IN 6-BIT CODE

| 000001 | 111111 | 111111 | 111111 | 000001 | 111111 | 111111 | 000111 | 000011 | 111111 | 1111 |

FIRST STAGE 3:2 COMPRESSORS
CARRY-SAVE OUTPUT

| 00,01 | 11,11 | 11,11 | 11,11 | 00,01 | 11,11 | 11,11 | 00,11 | 00,10 | 11,11 | 11,1 |

FIRST STAGE ZEROING:
ADJUSTED CARRY-
SAVE OUTPUT

| 00,01 | 00,00 | 00,00 | 00,00 | 00,00 | 00,00 | 00,00 | 00,00 | 00,10 | 11,11 | 11,1 |

SECOND STAGE
ZEROING:
ADJUSTED
CARRY-SAVE
OUTPUT

| 00,00 | 00,00 | 00,00 | 00,00 | 00,00 | 00,00 | 00,00 | 00,00 | 00,10 | 11,11 | 11,1 |

THIRD TO TENTH STAGES
OF COMPRESSOR TREE

OUTPUT

| 001100 |

FIG. 7

COMBINED SET BIT COUNT AND DETECTOR LOGIC

FIELD

The invention is generally related to hardware acceleration within a microprocessor, and more particularly to combined logic for set bit count and detector functions.

BACKGROUND

Microprocessors frequently include hardware acceleration circuits targeted to specific applications. Such application-targeted hardware accelerators help improve the performance-per-Watt (GOPS/Watt) of general-purpose execution cores. Thus, a microprocessor designed for general purpose operation may be capable of performing a certain task, but will take longer and/or consume more power than having a specially designed circuit to perform the task. Such accelerators are generally triggered by the use of a special-purpose instruction included in the processor instruction set architecture (ISA). Thus, such special-purpose instructions trigger the general-purpose core to "offload" the execution of the task to the appropriate acceleration hardware, thereby providing performance-optimized, lower-latency, lower power operation for accelerating targeted workloads. One example is a so-called "POPCNT" (PopCount) instruction, which is an application-targeted instruction used to accelerate search operations involving large data sets. The PopCount instruction hardware "counts" or detects or calculates the number of set bits in a data object. Applications that benefit from this instruction include genome mining, handwriting recognition, digital health workloads, and fast hamming distance counts. The wide application of the instruction has made it a rather critical part of operation in modern-day search engines.

Other examples include BitScanForward (BSF) and BitScanReverse (BSR) instructions, which are used extensively in floating-point operations for rounding and normalization of floating-point numbers. These bit-scan instructions trigger bit detection operations that locate a particular bit of interest in an input word. Specifically, BSF returns the bit-position of the least-significant set bit (scans from the LSB (least significant bit) of the input word to the MSB (most significant bit)), and BSR returns the most-significant set bit (scanning from the MSB to the LSB) in the input word.

In current microprocessor implementations, each of these acceleration functions can be thought of as intrinsically tied to their hardware acceleration circuits. While these instructions and their associated hardware acceleration circuits can provide improved performance in a microprocessor, currently each additional hardware acceleration circuit increases the amount of integrated circuit (IC) "real estate" necessary to manufacture the microprocessor. Increased use of semiconductor area increases the size, cost, and power consumption of a microprocessor.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 7 is a representation of an embodiment of an operation flow for an input word with a unified hardware accelerator.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As described herein, unified accelerator hardware enables reuse of logic in various hardware acceleration functions. In particular, a compressor tree utilized for a PopCount (PopCount) function is reused by a BitScan function. The BitScan can be bit scan forward (BSF) and/or bit scan reverse (BSR). Selector logic is added to enable the compressor tree to operate on an input word for the PopCount and BitScan operation. The selector logic enables the desired operation (based on an instruction received at the microprocessor), and may prepare the input word for execution of the operations associated with the instruction. The input word is encoded if the BitScan operation is selected. The compressor tree receives the input word, operates on the bits as though all bits have same level of significance (e.g., for an N-bit input word, the input word is treated as N one-bit inputs). The result of the compressor tree circuit is a binary value representing a number related to the operation performed. For the PopCount, the result indicates the number of set bits in the input word. For the BitScan operation, the result indicates the bit position of the first set bit encountered by scanning the input word (either the set bit closest to the LSB for BSF, or the set bit closest to the MSB for BSR).

Figure 1:
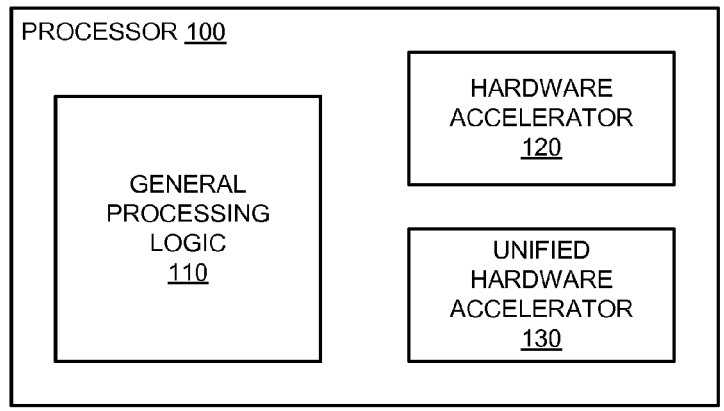
FIG. 1 is a block diagram of an embodiment of a processor with a unified hardware accelerator.

FIG. 1 is a block diagram of an embodiment of a processor with a unified hardware accelerator. Processor 100 represents any type of processor that may have a hardware accelerator. Processor 100 includes general processing logic 110, which represents the general-purpose logic to perform operations on most instructions in the instruction set architecture (ISA) of processor 100. General processing logic 110 may include arithmetic logic unit(s) (ALU), buses, and other circuits. The ISA is intended to represent a general concept of instructions supported by the processor. Certain instructions are supported by processor 100, but are processed by hardware acceleration circuits that are designed specifically (often referred to as "optimized") for execution of the particular instructions. Hardware accelerator 120 represents a circuit that is designed specifically to perform an operation according to one instruction, or a set of similar instructions.

In current architectures, processor 100 may include three hardware accelerators 120 to perform each of the PopCount, BSF, and BSR operations. Contrast that with processor 100 that includes unified hardware accelerator 130. Unified hardware accelerator 130 includes hardware to perform the PopCount operation, as well as a BitScan operation. The BitScan operation can be one or both of BSF and BSR. Additional logic is required for each BitScan operation, as is discussed in more detail below.

It can be observed that implementation of PopCount and BSF and BSR are possible on similar arithmetic circuits. Therefore, there is a potential for sharing hardware between these units, thereby reducing total energy consumption and layout area in the execution core. To take advantage of the potential for sharing hardware, in one embodiment a unified datapath is created to provide input into a compressor tree to perform PopCount, BSR, and BSF operations. The PopCount instruction returns the total count of set bits in a data word. Hence for a 64-bit word, $$POPCNT = \sum_{i=0}^{63} b_i. \quad (1)$$

Note that the PopCount result for a 64-bit input word is a 7-bit value (for a potential of 64 total bits, or 0x1000000b). The result for the BSF or BSR instructions is a 6-bit value to represent any of the 0-63 positions. Similarly, a 32-bit input word would require 6 bits for PopCount, and 5 bits for the BitScan operations. The result can thus be provided in a result having ($\log_2$ N) bits for the BitScan operations, and ($\log_2$ N)+1 bits for the PopCount operation.

Consider a 1.2V, 65 nm CMOS (complementary metal-oxide-semiconductor) process to implement the merged PopCount-BitScan datapath as described herein. Under simulation conditions of 2.1 GHz operation, with a worst-case total power consumption of 6.25 mW and a leakage component of 0.3 mW (i.e., 5% of total power at 1.2V, 110° C.), the unified or merged datapath achieved 26% lower total energy consumption, 20% lower area while consuming 33% lower leakage energy, and with 15% lower delay, when compared to a conventional 65 nm microprocessor execution core implementation using separate datapaths for PopCount, BSF and BSR.

While the implementation of the merged datapath circuit is described herein in an implementation as a hardware acceleration circuit of a general-purpose processor, the merged datapath circuit could also be implemented, for example, in an application specific integrated circuit (ASIC) or other design. Thus, the description with reference to inclusion as a hardware acceleration circuit within a processor is understood as only one, non-limiting implementation, and other implementations are possible.

Figure 2:
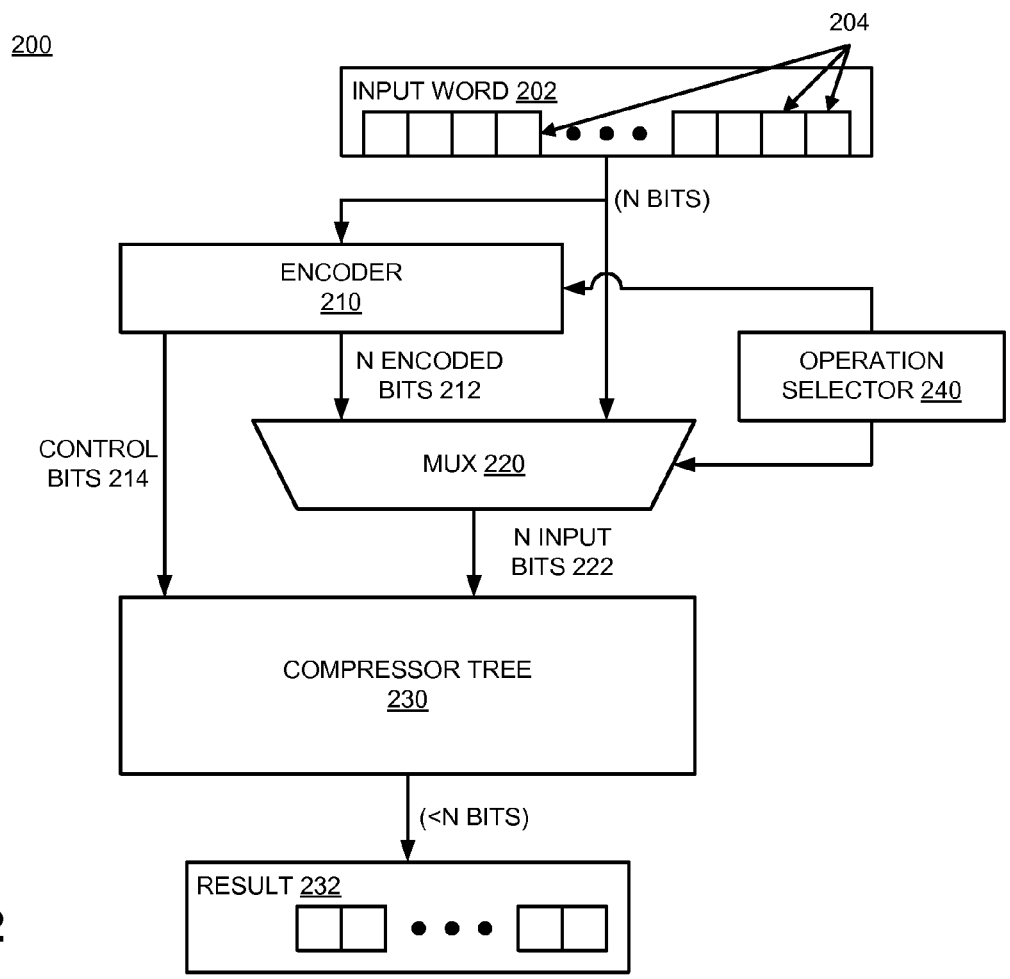
FIG. 2 is a block diagram of an embodiment of a unified hardware accelerator.

FIG. 2 is a block diagram of an embodiment of a unified hardware accelerator. Circuit 200 represents an integrated circuit in which a unified PopCount and BitScan operation datapath is implemented. Input word 202 represents a binary value, which may have, for example, 64 or 32 bits 204 (only a few of the bit positions are pointed to for purposes of simplicity in description, consider that input word 202 has N bits 204. The N bits 204 are understood as a binary value of 0 to $2^N-1$. However, for purposes of the operations to be executed by the hardware of circuit 200, input bits 204 are treated as N one-bit inputs. The N bits 204 are received at encoder 210 and multiplexer (mux) 220. Depending on what operation is selected, mux 220 passes as the N input bits 222, either the N bits 204 of input word 202, or N encoded bits 212 of encoder 210. The operation of encoder 210 is discussed in more detail below. As an overview, it is sufficient to observe that when a BitScan operation is selected, the bits of input word 202 may be "preprocessed" for operation of the BitScan operation on the same compressor tree used for the PopCount operation.

Operation selector 240 represents one or more logic elements, which may or may not be considered a single circuit, which enables encoder 210 to encode input word 202 into N encoded bits 212, and operates to select mux 220 to the N encoded bits 212 for BitScan operations. Alternatively, encoder 210 could always be enabled. In addition to encoding bits 204, encoder 210 may additionally provide control bits 214 to affect the operation of compressor tree 230. In one embodiment, encoder 210 improves the performance of compressor tree 230 by zeroing out groups of bits within compressor tree 230, or alternatively setting bits within compressor tree 230, in response to detecting a set bit in a BitScan operation. The concept of zeroing and setting bits is described in more detail below, especially in reference to FIG. 7.

Compressor tree 230 performs the compression of the input bits 222 (either directly on bits 204, or encoded as N encoded bits 212) of input word 202 to generate result 232. Result 232 has fewer than N bits, and as described above, may have a logarithmic relationship with the number of input bits 222. Compressor tree 230 may be any form of compressor circuit, and many are known in the art. For example, 4:2 compressors are known, as well as adder circuit, or some other logic combination. In one embodiment, as described in more detail herein, compressor tree 230 is a Wallace architecture of 3:2 compressors and half-adders. The Wallace architecture as described herein may operate on bits grouped into groups of 6 bits each. Such a combination provides convenient design and operation, but will be understood as a design choice that may be modified, especially depending on the architecture of the compressor tree.

As mentioned above, the operation of encoder 210 preprocesses the bits of input word 202 to allow compressor tree 230 to receive and operate on the bits in a similar manner for a BitScan operation as for a PopCount operation. A simple way to visualize the operation of one embodiment of circuit 200 is that for PopCount, each input bit 222 is treated as a separate input, and all input bits 222 are summed together to generate result 232. Result 232 will thus constitute a count of the number of ones or set bits within input word 202.

For BSF, circuit 200 computes the location of the first set bit (or one bit) when scanning the input from the LSB towards the MSB of input word 202. For a 64-bit example, the BSF datapath takes in a 64-bit input word 202 and generates a 6-bit result 232 that represents the bit position of the first one. Traditional methods to implement the BSF instruction would split the 64-bit word into 4-bit blocks, generating a 3-bit count that also determines the lower 2 bits of the output. The 3-bit counts are then merged together in a logarithmic tree to generate the remaining output bits. Such a traditional approach requires a separate datapath of counters, resulting in higher area and power.

However, as described herein, the merged datapath includes encoder 210 to encode bits of input word 202 to create N encoded bits 212 having a number of ones in the encoded output that is equal to the bit position of the first set bit in the input. Such encoded data can be directly sent into compressor tree 230, which will calculate the number of ones in the encoded input data, and return a "count" result that actually represents the bit position of the first set bit. As described above, in one embodiment, the input bits are grouped in groups of 6 bits. In such an implementation, each group of 6 bits may be separately encoded. The encoding may appear as follows for each group of 6 bits:

TABLE 1

BSF encoding - creating an input with a number of ones equal to the bit position of the first set bit.

| b[5] | b[4] | b[3] | b[2] | b[1] | b[0] | e[5] | e[4] | e[3] | e[2] | e[1] | e[0] |
|------|------|------|------|------|------|------|------|------|------|------|------|
| x | x | x | x | x | 1 | 0 | 0 | 0 | 0 | 0 | 0 |
| x | x | x | x | 1 | 0 | 0 | 0 | 0 | 0 | 0 | 1 |
| x | x | x | 1 | 0 | 0 | 0 | 0 | 0 | 0 | 1 | 1 |
| x | x | 1 | 0 | 0 | 0 | 0 | 0 | 0 | 1 | 1 | 1 |
| x | 1 | 0 | 0 | 0 | 0 | 0 | 0 | 1 | 1 | 1 | 1 |
| 1 | 0 | 0 | 0 | 0 | 0 | 0 | 1 | 1 | 1 | 1 | 1 |
| 0 | 0 | 0 | 0 | 0 | 0 | 1 | 1 | 1 | 1 | 1 | 1 |

Thus, observe that when the least significant set bit of the 6-bit group is the LSB (b[0]), the encoded output will be 0x000000b, representing zero ones. When the least significant set bit is b[1], the encoded output is 0x000001b, providing a single one (all encoded bits added will result in a value of '1' indicating the bit position b[1]. Similarly, b[2] generates a 0x000011b (or two ones), which would generate a value of '2' indicating bit position b[2], and so forth. Note that the values of the bits of bit positions more significant than the first set bit position are not relevant for BSF. Thus, BSF encoding detects the position of the first set bit in each 6-bit section of the input word, generating encoded outputs e[5:0]. As shown in Table 1, the number of ones in e[5:0] represents the bit-position of the first set bit, scanning b[5:0] from the LSB. In the case where the 6 input bits are zeros, the encoded output e[5:0] has all 6 output bits set to 1. Such a scenario can be considered a "zero-detect" condition, which indicates that the group of 6 bits does not include a set bit.

As in the example above, in certain implementations, when e[5]=1, this is a condition that indicates the 6 bits b[5:0] do not contain a set bit. In such a case, the hardware can be configured to set all encoded bits to ones to reflect the assumption that a 6-bit input group of higher significance has a set bit. In one embodiment where N=64, encoder 210 includes ten 6-bit encoders and a 4-bit version of the same encoder for the 4 LSB bits of input word 202. In combination, these encoders receive and encode all 64 bits of input word 202 for the BSF operation. In addition to encoding the input bits, encoder 210 provides control bits 214 to compressor tree 230 to zero out 6-bit blocks or groups of input bits of higher significance than a detected set bit. Thus, when a set bit is detected in a group of bits, all bits of higher significance can be zeroed out to prevent compressor tree 230 from "adding" them to the final result 232.

For BSR, circuit 200 computes the location of the first set bit (or one bit) when scanning the input word from the MSB toward the LSB. For a 64-bit example, the BSR datapath takes in a 64-bit input word 202 and generates a 6-bit result 232 that represents the bit position of the first one. The analysis and consequent design are similar to BSF. The merged datapath includes encoder 210 to encode bits of input word 202 to create N encoded bits 212 having a number of ones in the encoded output that is equal to the bit position of the first set bit in the input. Such encoded data can be directly sent into compressor tree 230, which will calculate the number of ones in the encoded input data, and return a "count" result that actually represents the bit position of the first set bit. As described above, in one embodiment, the input bits are grouped in groups of 6 bits. In such an implementation, each group of 6 bits may be separately encoded. The encoding may appear as follows for each group of 6 bits:

TABLE 2

BSR encoding - creating an input with a number of ones equal to the bit position of the first set bit.

| b[5] | b[4] | b[3] | b[2] | b[1] | b[0] | e[5] | e[4] | e[3] | e[2] | e[1] | e[0] |
|------|------|------|------|------|------|------|------|------|------|------|------|
| 0 | 0 | 0 | 0 | 0 | 1 | 0 | 0 | 0 | 0 | 0 | 0 |
| 0 | 0 | 0 | 0 | 1 | x | 0 | 0 | 0 | 0 | 0 | 1 |
| 0 | 0 | 0 | 1 | x | x | 0 | 0 | 0 | 0 | 1 | 1 |
| 0 | 0 | 1 | x | x | x | 0 | 0 | 0 | 1 | 1 | 1 |
| 0 | 1 | x | x | x | x | 0 | 0 | 1 | 1 | 1 | 1 |
| 1 | x | x | x | x | x | 0 | 1 | 1 | 1 | 1 | 1 |
| 0 | 0 | 0 | 0 | 0 | 0 | 0 | 0 | 0 | 0 | 0 | 0 |

Observe that when the most significant set bit of the 6-bit group is the LSB (b[0]), the encoded output will be 0x000000b, representing zero ones. When the most significant set bit is b[1], the encoded output is 0x000001b, providing a single one (all encoded bits added will result in a value of '1' indicating the bit position b[1]. Similarly, b[2] generates a 0x000011b (or two ones), which would generate a value of '2' indicating bit position b[2], and so forth. Note that the values of the bits of bit positions less significant than the first set bit position are not relevant for BSR. Thus, BSR encoding detects the position of the first set bit (most significant set bit) in each 6-bit section of the input word, generating encoded outputs e[5:0]. As shown in Table 2, the number of ones in e[5:0] represents the bit-position of the first set bit, scanning b[5:0] from the MSB. In the case where the 6 input bits are zeros, the encoded output e[5:0] has all 6 output bits set to zero. Such a scenario indicates that no bits are set within the 6-bit group, and the expectation is that a bit must be set in a group of lower bit significance. In the case where a set bit is detected, groups below it can be "zeroed," similar to the BSF case. Note that although the terminology used here is the same, "zeroing" for purposes of BSR refers to forcing all outputs to '1' bits for groups of lower significance.

Logic circuits to implement the encoding defined in the above tables are described in more detail below. The logic to encode the two BitScan operations may also be merged, as also described below.

Figure 3A:
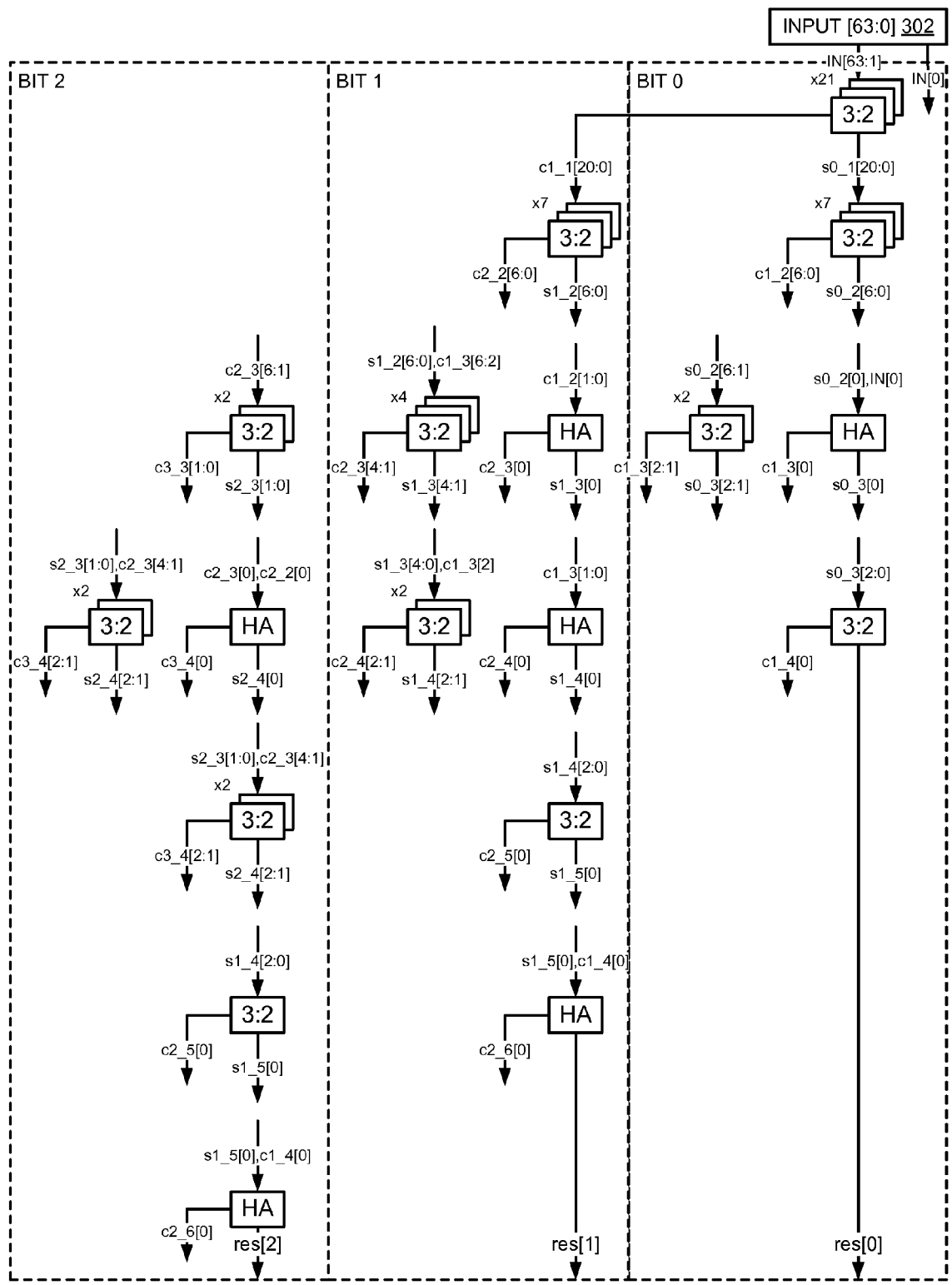
FIGS. 3A-3B are a representation of an embodiment of a Wallace-tree-architecture compressor tree circuit.
Figure 3B:
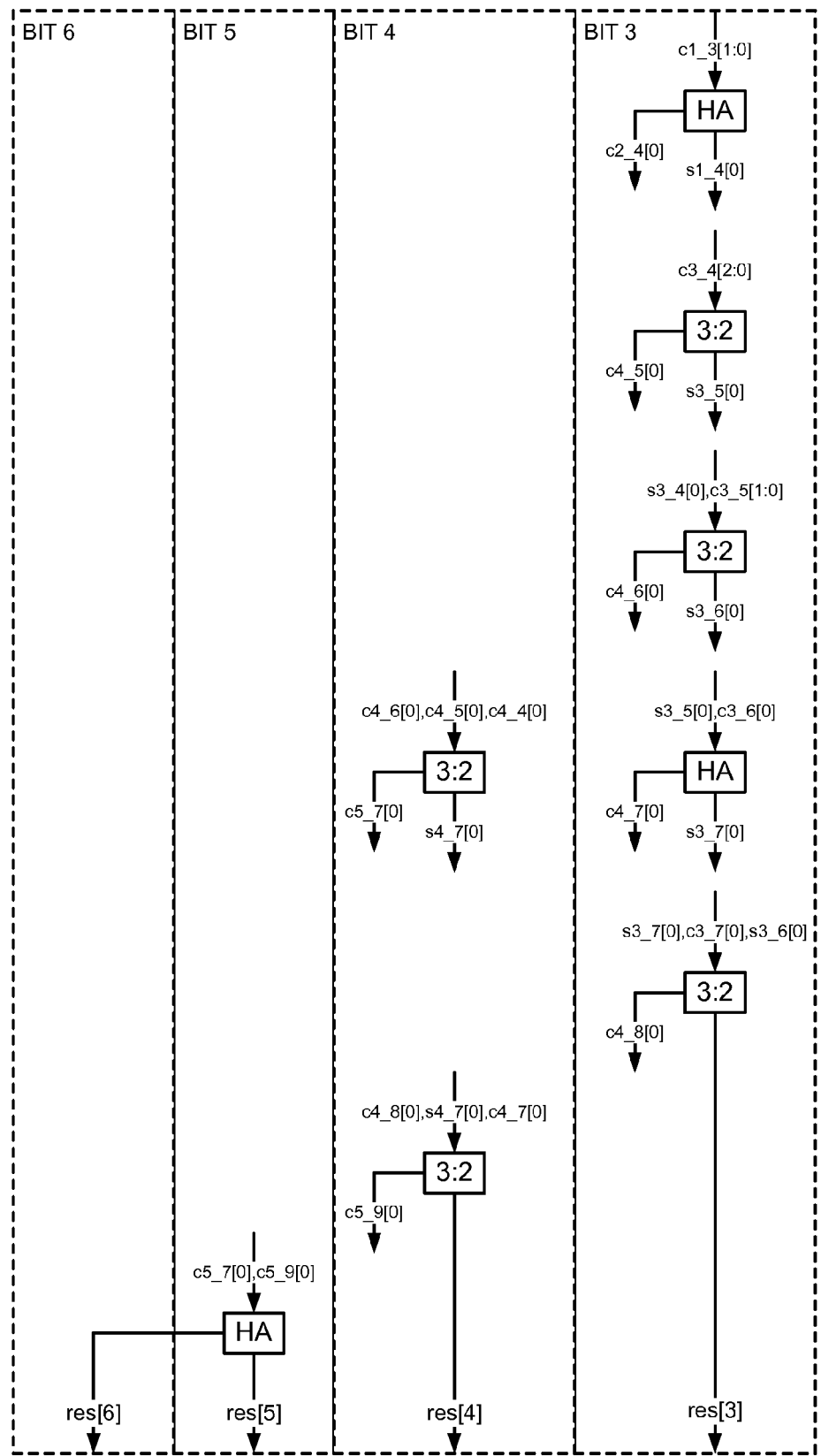

FIGS. 3A-3B are a representation of an embodiment of a Wallace-tree-architecture compressor tree circuit. The figures themselves provide an example of Wallace-tree layout for the compressor tree circuit. The compressor tree circuit includes ten stages, and the layout is organized into which result or output bit is calculated by particular logic. The Figures provide sufficient detail to the extent that a detailed explanation of the flow of bits through the various stages is not provided herein. The Figures set forth, for example, for a 64-bit input 302, where particular bits are routed to calculate the final results. When multiple cascaded boxes are shown, it is to be understood that multiple of the particular element would be present, as indicated by the multiplier next to the cascaded boxes (e.g., ×21, ×7, ×2, etc.). It will be understood that the particular architecture shown is simply one example, and many other architectures could be used, even of 3:2 compressors and half-adders, for the compressor circuit.

As illustrated, the compressor tree circuit uses 57 3:2 compressors and 8 half-adders. In the first-stage, there are 21 3:2 compressors, each compressor taking in 3 inputs of identical significance, generating a sum-bit of the same significance and a carry-bit of higher significance. Compression of input bit In[0], is postponed until the third stage. Subsequent stages of the compressor tree use a combination of 3:2 compressors and half-adders to combine, sum, and carry bits together to generate the final count outputs. While circuits other than 3:2 compressors and half-adders could be used, use of 3:2 compressors and half-adders provides high compression, resulting in a faster design that is area and power efficient.

Figure 4A:
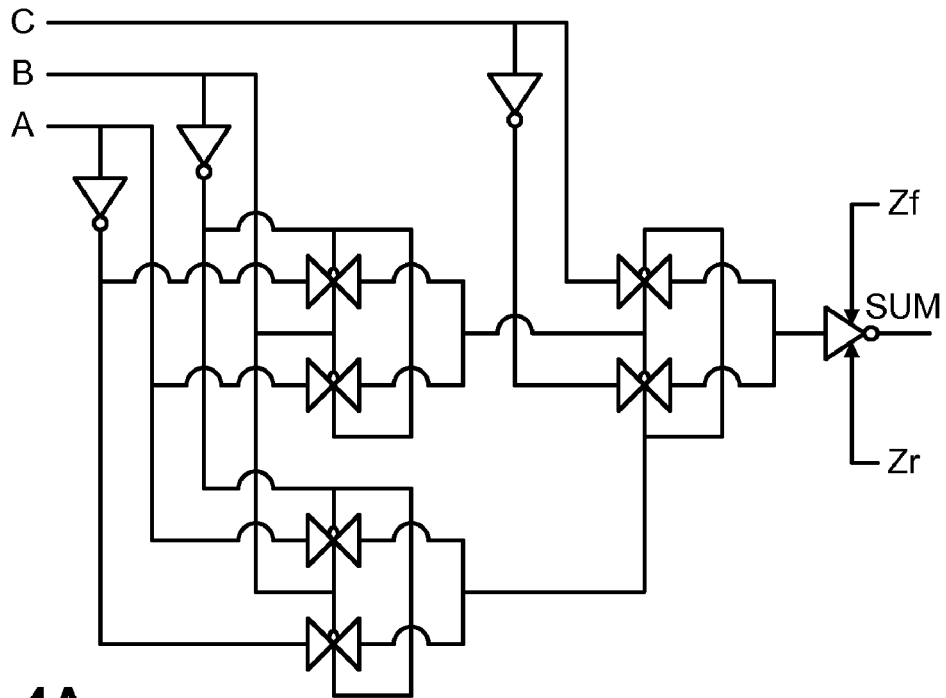
FIG. 4A is a block diagram of an embodiment of a circuit to implement a 3:2 compressor sum result.

FIG. 4A is a block diagram of an embodiment of a circuit to implement a 3:2 compressor sum result. A 3:2 compressor may also sometimes be referred to as a full adder. Circuit 400 receives three inputs, labeled A, B, and C here, and generates a sum. Circuit 400 performs the function (A XOR B) XOR C. Note that one common approach to implementing the function is with XOR gates. However, the same result may be achieved as implemented in FIG. 4A with passgates. Each input A, B, and C, is received at a passgate, with the inverted input on the opposite side of the passgate. As is understood by those skilled in the art, a passgate operates by "passing" the signal when the signal is high, and preventing the signal from passing when it is low, thus creating high and low outputs. The operation of circuit 400 is provided in complementing the passgates in pairs, where the pairs are driven by combinations of inputs to implement the XOR functionality. A and B are thus XORed, and the result is then XORed with C to generate the SUM.

In addition to performing the logic operation to generate the SUM, observe the control inputs to the output inverter. Zf refers to the zeroing control signal for BSF, and Zr refers to the zeroing control signal for BSR. When Zf is asserted, the output of SUM is always a '0'. When all output stage 3:2 compressors are zeroed, the resulting 6-bit output is all zeros. When Zr is asserted, the output of SUM is always a '1'. When all output stage 3:2 compressors are forced to a one, the resulting 6-bit output is all ones.

Figure 4B:
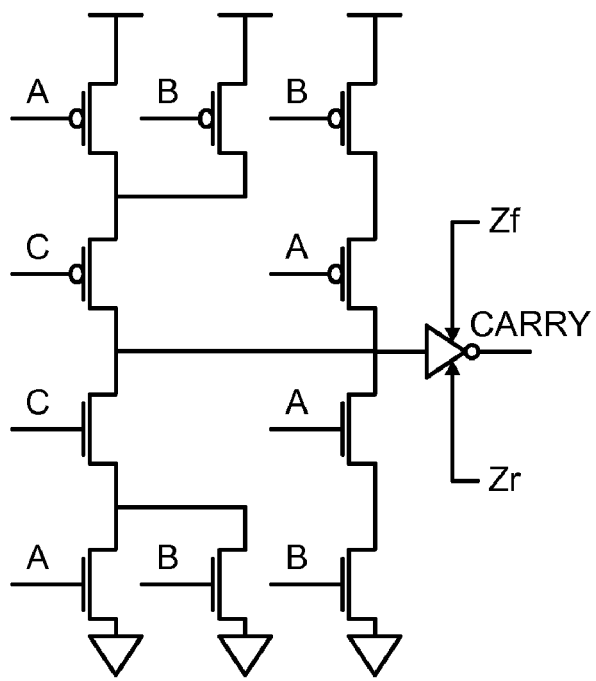
FIG. 4B is a block diagram of an embodiment of a circuit to implement a 3:2 compressor carry result.

FIG. 4B is a block diagram of an embodiment of a circuit to implement a 3:2 compressor carry result. Circuit 410 receives the same three inputs as circuit 400 of FIG. 4A, and generates the CARRY bit for the 3:2 compressor. The circuit operates as follows: the three inputs are received into an inverted transistor. When A, B, and C are logic low, the upper input transistors will pull the line high, as will the output transistors. The result will be a logic high signal to the input of the output inverter. The output inverter will then generate a '0' carry signal. When A, B, and C are logic high, the lower five transistors will turn on, causing a logic low signal to be received at the output inverter. The output inverter will then output a logic high, which is the desired operation. Observe that whenever C is a logic low, the bottom input transistors will not pull the output line low. Similarly, when C is a logic high, the upper input transistors will not pull the output line high.

Furthermore, when C is a logic low, and either A or B is low and the other is high, the upper input transistors pull the output line high. However, because one of either A or B is a logic high and the other is low, neither the upper or lower stages of the output transistors will pull the line, which results in an insufficient signal to produce a '1' at the output of the output inverter.

In addition to performing the logic operation to generate the CARRY, observe the control inputs to the output inverter. Zf refers to the zeroing control signal for BSF, and Zr refers to the zeroing control signal for BSR. When Zf is asserted, the output of SUM is always a '0'. When Zr is asserted, the output of SUM is always a '1'.

Figure 5A:
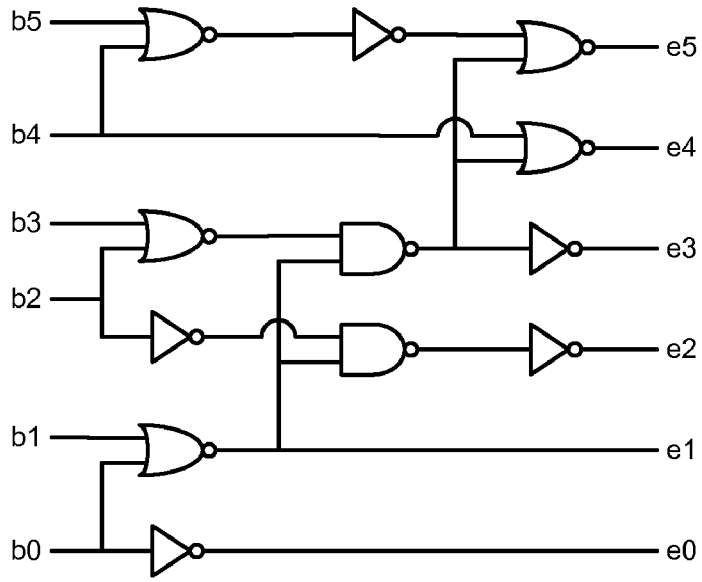
FIGS. 5A-5C are block diagrams of embodiments of encoders for a unified hardware accelerator.
Figure 5B:
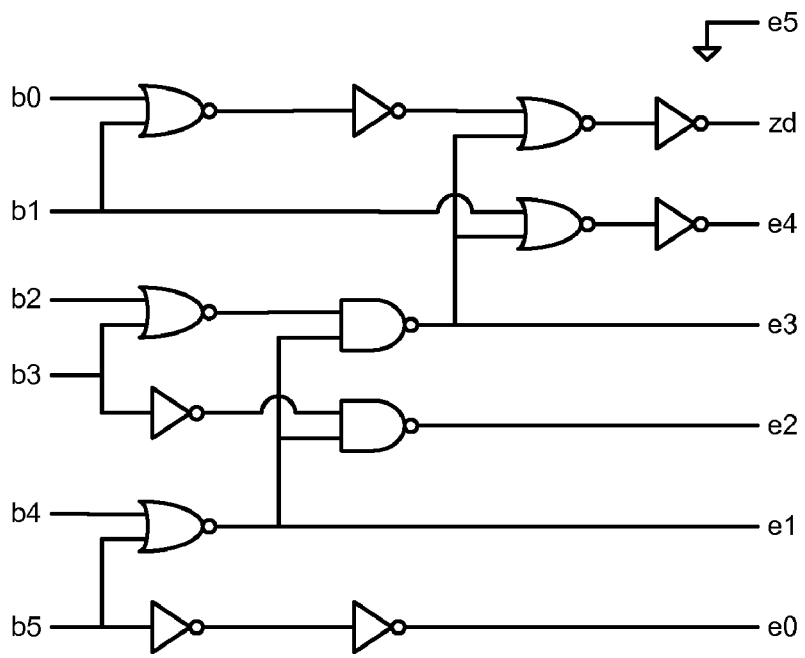
Figure 5C:
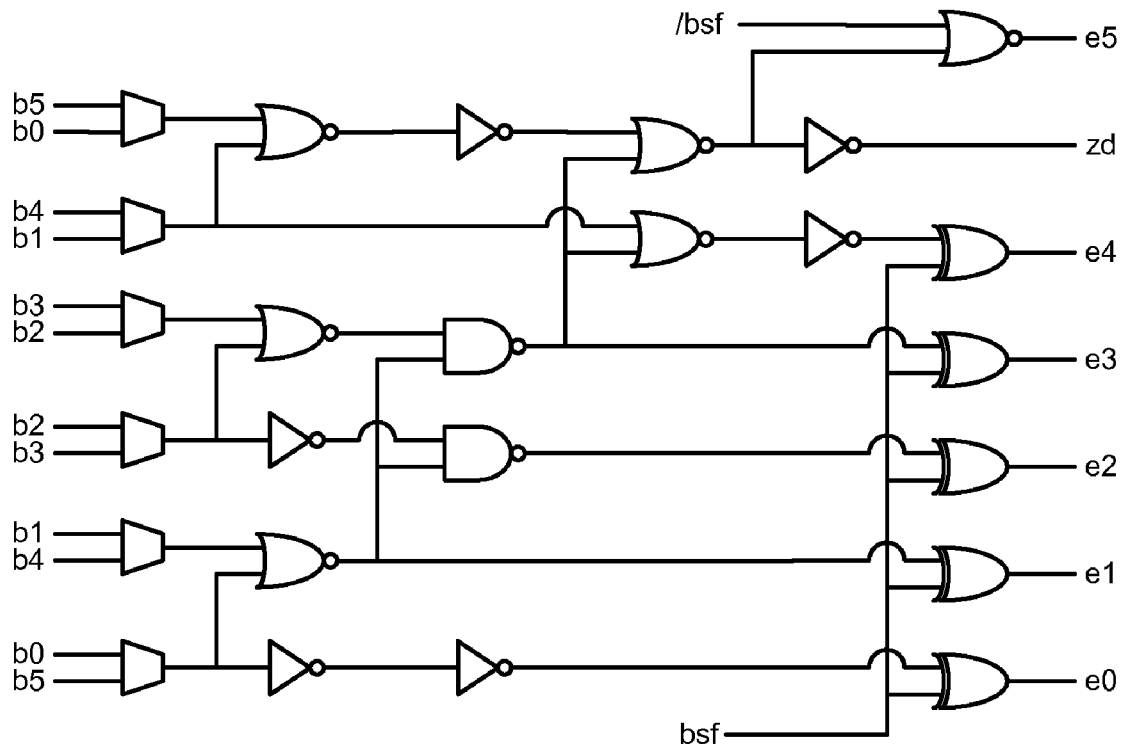

FIGS. 5A-5C are block diagrams of embodiments of encoders for a unified hardware accelerator. FIGS. 5A and 5B illustrate the separate logic for individual BSF and BSR, respectively, encoding. FIG. 5C illustrates combined logic to produce both encoding.

Circuit 510 of FIG. 5A receives 6 input bits b[5:0], and generates 6 encoded output bits e[5:0] for BSF. The encoding generates the encoding shown in Table 1 above. Circuit 510 can simply be understood as hardware logic to perform the logic of Table 1. b[0] is inverted to produce e[0] (e[0]=/b[0]). b[0] and b[1] are NORed together to generate e[1] (e[1]=b[0] NOR b[1]). b[2] is inverted, and NANDed together with the NORed result of b[0] and b[1], and the result inverted to generate e[2] (e[2]=/(/b[2] NAND (b[0] NOR b[1]))). b[3] is NORed with b[2] and the result NANDed together with the NORed result of b[0] and b[1], and inverted to generate e[3] (e[3]=/((b[3] NOR b[2]) NAND (b[0] NOR b[1]))). b[4] is NORed with /e[3] (the output of the NAND gate in the e[3] logic line, referred to as /e[3] for convenience) to generate e[4] (e[4]=b[4] NOR /e[3]). b[5] is NORed with b[4], and the output inverted and NORed with /e[3] to generate e[5] (e[5]=/(b[5] NOR b[4]) NOR /e[3]).

Circuit 520 of FIG. 5B receives 6 input bits b[5:0], and generates 6 encoded output bits e[5:0] for BSR. The encoding generates the encoding shown in Table 2 above. Circuit 520 can simply be understood as hardware logic to perform the logic of Table 2. b[5] is double-inverted to produce e[0] (e[0]=/(/b[5])). b[5] and b[4] are NORed together to generate e[1] (e[1]=b[5] NOR b[4]). b[3] is inverted, and NANDed together with the NORed result of b[5] and b[4] to generate e[2] (e[2]=/b[3] NAND (b[5] NOR b[4])). b[2] is NORed with b[3] and the result NANDed together with the NORed result of b[5] and b[4] to generate e[3] (e[3]=((b[3] NOR b[2]) NAND (b[5] NOR b[4]))). b[1] is NORed with /e[3] (the output of the NAND gate in the e[3] logic line, referred to as /e[3] for convenience) and inverted to generate e[4] (e[4]=/(b[4] NOR /e[3])). e[5] is always low, and so is tied low. In addition to the result logic, circuit 520 also generates a zero-detect bit zd. b[0] is NORed with b[1], and the output inverted and NORed with /e[3], and inverted to generate zd (zd=/(/(b[0] NOR b[1]) NOR /e[3])).

Observe that there is a similarity in the encoder logic for BSF and BSR. FIG. 5C illustrates a reuse of common circuit elements to achieve both encoding operations. Circuit 530 swaps the input bits b[5:0] using 2:1 multiplexers at the inputs of the block (where the input is selected by whether the function is BSF or BSR—not shown). Output XOR gates are used to conditionally invert outputs e[4:0] during BSF operation. In one embodiment, encoder outputs are sent into the compressor tree during BSF/BSR operations through a 2:1 multiplexer. Note a difference in e[5] for circuit 530. The only time in either encoding scheme where e[5] is set is in BSF when all input bits b[5:0] are zeros. Following the logic the reader will observe that the only case in BSF where a '1' bit is present at the last NOR gate is when all inputs are zero. In BSR, the /BSF signal will be a logic high, resulting in a zero output at e[5] for all cases in BSR.

Figure 6:
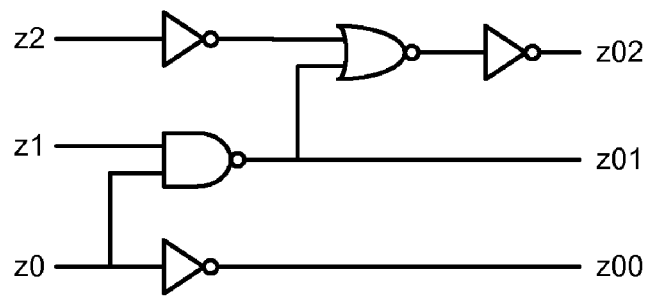
FIG. 6 is a block diagram of an embodiment of a zero-detect circuit for a unified hardware accelerator.

FIG. 6 is a block diagram of an embodiment of a zero-detect tree circuit for a unified hardware accelerator. Circuit 600 represents an example of a 3-bit zero-detect tree (ZDT) circuit. A ZDT can be used to merge zero-detect bits. In one embodiment, zero detection completes in 2 stages and occurs in parallel to the first two 3:2 compressor stages. In the first stage of the compressor tree, 3:2 compressor outputs can be zeroed out, for example, by converting the output inverters of FIGS. 4A and 4B to NOR gates and feeding the circuit result with one of the ZDT outputs z[02:00]. A second stage of ZDT extends the zeroing operation from 6 (single zero detect), 12 (2-bit zero detect), and 18-bit (3-bit zero detect) boundaries to the entire input word (e.g., a 64-bit word). In one embodiment, the second stage of ZDT occurs in the second stage of the compressor tree. The compressor tree sums all the bits that do not get zeroed out by the zeroing stages.

Note that circuit 600 receives a "zero-detect" condition from an indication that other bits of different significance should be zeroed out (BSF) or set to one (BSR). For example, Table 1 above shows a zero-detect condition when e[5]=1, for example. Alternatively, some other zero detect signal may be used. A 3-bit zero detect as illustrated in circuit 600 can zero 18 bits of the input word, corresponding to three separate 6-bit groups.

FIG. 7 is a representation of an embodiment of an operation flow for an input word with a unified hardware accelerator. As discussed above, PopCount indicates a number of ones in an input word. The compressor tree logic can simply add each of the bits of the input word together to calculate a result indicating the total number of ones. Examples of the operation of PopCount are provided below. In the below examples, the input word is shown in groups of six bits, with the four LSBs being another group:

| 111111 | 111111 | 111111 | 111111 | 111111 | 111111 | 111111 | 111111 | 111111 | 111111 | 1111 |

POPCNT = 1000000

| 000000 | 000000 | 000000 | 000000 | 000000 | 001111 | 111111 | 111111 | 111111 | 111111 | 1111 |

POPCNT = 0100000

| 111111 | 111111 | 111111 | 111111 | 111111 | 110000 | 000000 | 000000 | 000000 | 000000 | 0000 |

POPCNT = 0100000

| 000000 | 000000 | 000000 | 000000 | 000000 | 000000 | 000000 | 000000 | 000000 | 000000 | 0000 |

POPCNT = 0000000

| 111111 | 111111 | 111111 | 111111 | 111111 | 111111 | 111111 | 111111 | 111111 | 111111 | 1110 |

POPCNT = 0111111

As discussed above, the BSF operation computes the location of the first set bit when scanning the input word from the LSB towards the MSB. The input word is encoded to result in an input word for operation by the compressor tree used for PopCount that will calculate the location of the first set bit. The encoded input bits will have a number of ones (after zeroing) that will equal the bit position of the first set bit. Examples of BSF operation are shown below, where the input word is organized in groups of six bits, with the four LSBs being another group:

| 111111 | 111111 | 111111 | 111111 | 111111 | 111111 | 111111 | 111111 | 111111 | 111111 | 1111 |

BSF = 000000

| 000000 | 000000 | 000000 | 000000 | 000000 | 000000 | 000000 | 000000 | 000000 | 000000 | 0001 |

BSF = 000000

| 000000 | 000000 | 000000 | 000000 | 000000 | 010000 | 000000 | 000000 | 000000 | 000000 | 0000 |

BSF = 010000

| 010000 | 000000 | 000010 | 000000 | 000000 | 001000 | 000000 | 000000 | 000000 | 000000 | 0010 |

BSF = 000001

As discussed above, the BSR operation computes the location of the first set bit when scanning the input word from the MSB towards the LSB. The input word is encoded to result in an input word for operation by the compressor tree used for PopCount that will calculate the location of the first set bit. The encoded input bits will have a number of ones (after "zeroing") that will equal the bit position of the first set bit. Examples of BSR operation are shown below, where the input word is organized in groups of six bits, with the four LSBs being another group:

| 111111 | 111111 | 111111 | 111111 | 111111 | 111111 | 111111 | 111111 | 111111 | 111111 | 1111 |

BSR = 111111

| 000000 | 000000 | 000000 | 000000 | 000000 | 000000 | 000000 | 000000 | 000000 | 000000 | 0001 |

BSR = 000000

| 000000 | 000000 | 000000 | 000000 | 000000 | 010000 | 000000 | 000000 | 000000 | 000000 | 0000 |

BSR = 010000

| 010000 | 000000 | 000010 | 000000 | 000000 | 001000 | 000000 | 000000 | 000000 | 000000 | 0010 |

BSR = 111110

The operation of these functions is performed on unified hardware, as described herein. FIG. 7 illustrates an example of BSF as performed on the compressor tree also used for PopCount. The first line shows the 64-bit input, which has a '1' bit highlighted at position 0x001100, which is the value that should be returned in response to the instruction to perform the BSF operation. The first stage involves encoding of the input word, which is performed in this example in 6-bit groups. More particularly, it will be observed that each 6-bit group is encoded to provide a value that indicates the first set bit of the individual 6-bit group. Thus, the most significant 6-bit group is encoded as '000001' to indicate the first set bit within '010110' is in bit position 1. The next most significant group has no set bits, and thus is encoded as '111111' to indicate no set bit is found and is assumed to be at a bit of higher significance.

The next stage shows the results of a first stage of 3:2 compressors, where a carry-save output is shown for each set of 3 bits within the 6-bit group. Thus, the most significant block shows 00,01, indicating the results of 3:2 compression of '000' and '001', respectively. The next most significant block shows a 11,11 resulting from 3:2 compression of '111' and '111'. The next stage shows the first stage of zeroing, which results in an adjusted carry-save output. Counting from the least significant block, the third block has a zero at e[5], as does the fourth block. Thus, the zero-detect condition can cause the zeroing of blocks of more-significant bits. Thus, the fourth block is zeroed. Similarly, the fifth, sixth, and seventh blocks are also zeroed. The next stage of zeroing adjusts the carry-save output to remove any set bits from the carry-save output that may be present because it was not yet zeroed. Thus, the most significant block is zeroed. After the zeroing stages, the remaining stages of the compressor tree (e.g., stages 2 to 10) may be add the inputs bits that are not zeroed out, resulting in the required result '1100'.

Figure 8:
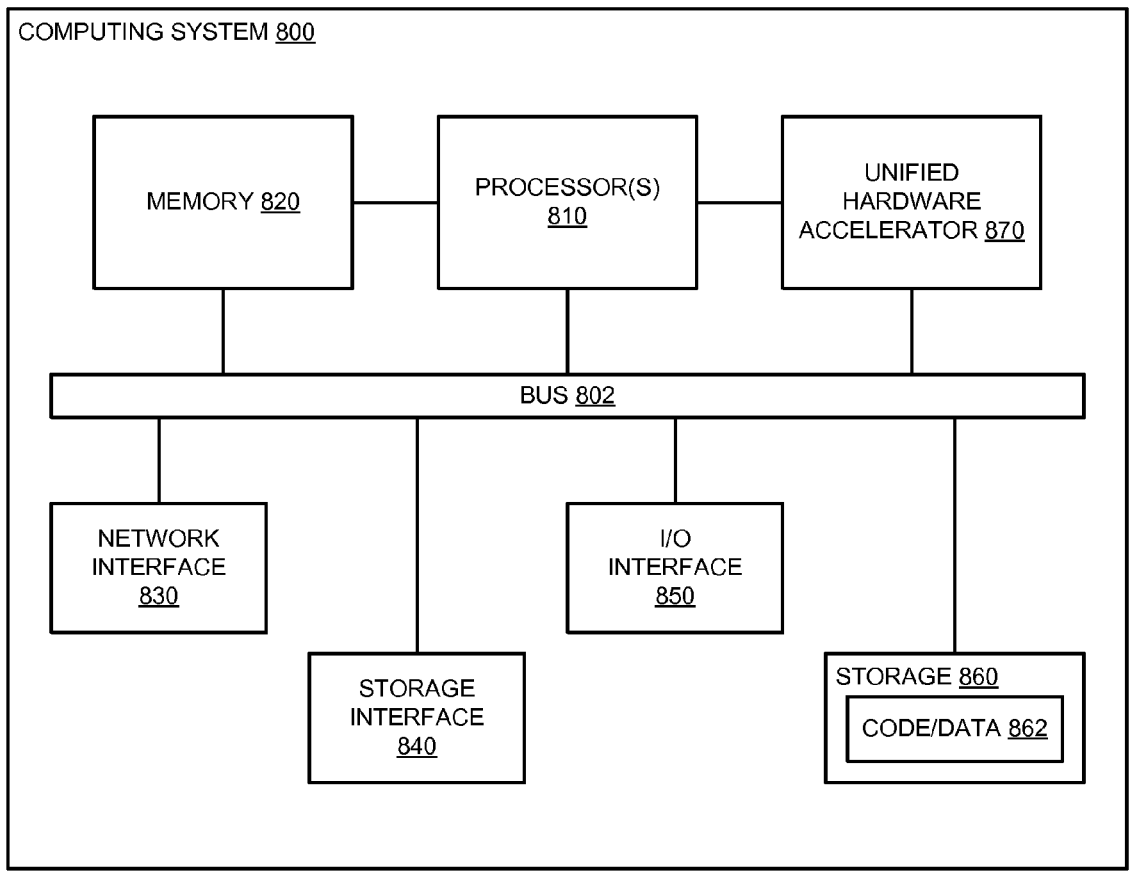
FIG. 8 is a block diagram of an embodiment of a computing system on which embodiments of the invention can be implemented.

FIG. 8 is a block diagram of an embodiment of a computing system on which embodiments of the invention can be implemented. Computing system 800 represents hardware that might execute one or more event server nodes, or LE nodes as described herein. Computing system 800 is depicted with various components that may be present in whole or in part, and additional components or subcomponents may also be present. Computing system 800 includes one or more processors 810, which executes instructions and may perform various operations as described herein. Processor 810 may include any type of microprocessor, central processing unit (CPU), processing core, etc. Processor 810 controls the overall operation of the computing system 800, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 820 represents the main memory of the computing system 800, and provides temporary storage for code (e.g., software routines or series of instructions, commands, operations, programs, data, etc.) to be executed by processor 810.

Memory 820 represents the main memory of the computing system 800, and provides temporary storage for code (e.g., software routines or series of instructions, commands, operations, programs, data, etc.) to be executed by processor 810. Memory 820 may include read-only memory (ROM), flash memory, one or more varieties of random access memory (RAM), or the like, or a combination of such devices. Memory 820 stores data and instructions for performing operations.

The various components of computing system 800 are coupled to bus 802. Bus 802 is an abstraction that represents any one or more separate physical buses, communication lines, and/or point-to-point connections, connected by appropriate bridges, adapters, and/or controllers. Therefore, bus 802 may include, for example, one or more of a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Computing system 800 includes network interface 830, which represents hardware and software (e.g., drivers) that enable computing system 800 to communicate with remote devices (e.g., clients, data sources, and/or other event server nodes) over one or more networks. Processor 810 may execute various network stacks to control interfaces to various networks through network interface 830. Computing system 800 may include storage interface/adapter 840, which enables computing system 800 to access attached storage (e.g., a storage area network or other storage subsystem) and may be, for example, a Fibre Channel adapter, a SCSI adapter, etc. Computing system 800 includes one or more input/output (I/O) interface(s) 850, which may include one or more interface components to connect with other electronic equipment, for example, custom connections, blade adapters, etc. Additionally, I/O interfaces 850 can include video, audio, and/or alphanumeric interfaces through which a user interacts with computing system 800. Computing system 800 may include one or more internal storage device(s) 860. Storage 860 can be any conventional medium for storing large volumes of data in a non-volatile manner, such as magnetic, optical, and/or semiconductor-based disks. Storage 860 may hold code and/or data 862 in a persistent state (i.e., the value may be retained despite interruption of power to computing system 800).

Computing system 800 includes unified hardware accelerator 870, which is an abstraction to represent components that provide such an accelerator for processor 810. Accelerator 870 may be directly accessible to processor 810 and/or accessible over bus 802. In one embodiment, accelerator 870 is part of processor 810, such as being part of the same die, or the same integrated circuit (IC) packaging.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. An apparatus comprising:
    selector logic to select a logic operation on an input word having a number (N) of input bits, where the logic operation is one of a PopCount operation that indicates a number of set bits in the input word, or a BitScan operation that indicates a bit position within the input word of a first set bit encountered by scanning through the input word;
    an encoder coupled to the selector logic, the encoder to be enabled by the selector logic, to receive the input word and encode the input word into groups of input bits for the BitScan operation in response to the BitScan operation being selected; and
    a compressor tree logic circuit coupled to the selector logic and the encoder, to receive the input bits for the PopCount operation or the groups of input bits for the BitScan operation, and perform logic operations on the input bits as bits all having an equal level of significance, to compress the received input bits into a binary value having fewer than N bits, each with a different level of significance.

2. The apparatus of claim 1, wherein the BitScan operation comprises one of BSF (bit scan forward) that indicates a position of a set bit closest to the least significant bit (LSB) of the input word, and BSR (bit scan reverse) that indicates a bit position of a set bit closest to the most significant bit (MSB) of the input word.

3. The apparatus of claim 1, wherein the encoder is to encode the input word into groups of six (6) bits.

4. The apparatus of claim 3, wherein the encoder includes encoding logic to encode the input word into groups of six bits for BSF in accordance with the following:

| b[5] | b[4] | b[3] | b[2] | b[1] | b[0] | e[5] | e[4] | e[3] | e[2] | e[1] | e[0] |
|---|---|---|---|---|---|---|---|---|---|---|---|
| x | x | x | x | x | 1 | 0 | 0 | 0 | 0 | 0 | 0 |
| x | x | x | x | 1 | 0 | 0 | 0 | 0 | 0 | 0 | 1 |
| x | x | x | 1 | 0 | 0 | 0 | 0 | 0 | 0 | 1 | 1 |
| x | x | 1 | 0 | 0 | 0 | 0 | 0 | 0 | 1 | 1 | 1 |
| x | 1 | 0 | 0 | 0 | 0 | 0 | 0 | 1 | 1 | 1 | 1 |
| 1 | 0 | 0 | 0 | 0 | 0 | 0 | 1 | 1 | 1 | 1 | 1 |
| 0 | 0 | 0 | 0 | 0 | 0 | 1 | 1 | 1 | 1 | 1 | 1 | where each row indicates a corresponding encoded output for an input group of six bits, where b[5:0] indicates the value of each bit of a group of six bits, and e[5:0] indicates the corresponding encoded output.

5. The apparatus of claim 3, wherein the encoder includes encoding logic to encode the input word into groups of six bits for BSR in accordance with the following:

| b[5] | b[4] | b[3] | b[2] | b[1] | b[0] | e[5] | e[4] | e[3] | e[2] | e[1] | e[0] |
|------|------|------|------|------|------|------|------|------|------|------|------|
| 0 | 0 | 0 | 0 | 0 | 1 | 0 | 0 | 0 | 0 | 0 | 0 |
| 0 | 0 | 0 | 0 | 1 | x | 0 | 0 | 0 | 0 | 0 | 1 |
| 0 | 0 | 0 | 1 | x | x | 0 | 0 | 0 | 0 | 1 | 1 |
| 0 | 0 | 1 | x | x | x | 0 | 0 | 0 | 1 | 1 | 1 |
| 0 | 1 | x | x | x | x | 0 | 0 | 1 | 1 | 1 | 1 |
| 1 | x | x | x | x | x | 0 | 1 | 1 | 1 | 1 | 1 |
| 0 | 0 | 0 | 0 | 0 | 0 | 0 | 0 | 0 | 0 | 0 | 0 | where each row indicates a corresponding encoded output for an input group of six bits, where b[5:0] indicates the value of each bit of a group of six bits, and e[5:0] indicates the corresponding encoded output.

6. The apparatus of claim 1, wherein the encoder is to further generate a zero-detect signal based on detecting a set bit, where the zero-detect signal indicates bit positions in the input word subsequent in the scan to the detected set bit should be ignored in performing the BitScan operation.

7. The apparatus of claim 6, wherein the compressor tree logic circuit further comprises logic to zero input bits corresponding to bit positions subsequent in the input word to the detected set bit, in response to the zero-detect signal.

8. The apparatus of claim 1, wherein the compressor tree logic circuit comprises a Wallace-tree of 3:2 compressors and half-adders.

9. The apparatus of claim 1, wherein the binary value has $\log_2 N$ bits for the BitScan operation, and $(\log_2 N)+1$ bits for the PopCount operation.

10. A processor comprising:
general processing logic to perform general-purpose operations to execute instructions received by the processor; and
a hardware acceleration circuit having
selector logic to select a logic operation on an input word having a number (N) of input bits, where the logic operation is one of a PopCount operation that indicates a number of set bits in the input word, or a BitScan operation that indicates a bit position within the input word of a first set bit encountered by scanning through the input word;
an encoder coupled to the selector logic, the encoder to be enabled by the selector logic, to receive the input word and encode the input word into groups of input bits for the BitScan operation in response to the BitScan operation being selected; and
a compressor tree logic circuit coupled to the selector logic and the encoder, to receive the input bits for the PopCount operation or the groups of input bits for the BitScan operation, and perform logic operations on the input bits as bits all having an equal level of significance, to compress the received input bits into a binary value having fewer than N bits, each with a different level of significance.

11. The processor of claim 10, wherein the processor supports an instruction set where a PopCount instruction and a BitScan instruction are to be executed by the hardware accelerator, and the general processing logic is to execute the other instructions in the instruction set.

12. The processor of claim 10, wherein the BitScan operation comprises one of BSF (bit scan forward) that indicates a position of a set bit closest to the least significant bit (LSB) of the input word, and BSR (bit scan reverse) that indicates a bit position of a set bit closest to the most significant bit (MSB) of the input word.

13. The processor of claim 10, wherein the encoder is to encode the input word into groups of six (6) bits.

14. The processor of claim 10, wherein the encoder is to further generate a zero-detect signal based on detecting a set bit, where the zero-detect signal indicates bit positions in the input word subsequent in the scan to the detected set bit should be ignored in performing the BitScan operation.

15. The processor of claim 14, wherein the compressor tree logic circuit further comprises logic to zero input bits corresponding to bit positions subsequent in the input word to the detected set bit, in response to the zero-detect signal.

16. The processor of claim 10, wherein the compressor tree logic circuit comprises a Wallace-tree of 3:2 compressors and half-adders.

17. The processor of claim 10, wherein the binary value has $\log_2 N$ bits for the BitScan operation, and $(\log_2 N)+1$ bits for the PopCount operation.

18. A system comprising:
a memory device to store an input word having a number (N) of input bits, on which a logic operation is to be performed; and
a processor to perform the logic operation, the processor including:
general processing logic to perform general-purpose operations to execute instructions received by the processor; and
a hardware acceleration circuit having selector logic to select the logic operation, where the logic operation is one of a PopCount operation that indicates a number of set bits in the input word, or a BitScan operation that indicates a bit position within the input word of a first set bit encountered by scanning through the input word; an encoder coupled to the selector logic, the encoder to be enabled by the selector logic, to receive the input word and encode the input word into groups of input bits for the BitScan operation in response to the BitScan operation being selected; and a compressor tree logic circuit coupled to the selector logic and the encoder, to receive the input bits for the PopCount operation or the groups of input bits for the BitScan operation, and perform logic operations on the input bits as bits all having an equal level of significance, to compress the received input bits into a binary value having fewer than N bits, each with a different level of significance.

19. The system of claim 18, wherein the BitScan operation comprises one of BSF (bit scan forward) that indicates a position of a set bit closest to the least significant bit (LSB) of the input word, and BSR (bit scan reverse) that indicates a bit position of a set bit closest to the most significant bit (MSB) of the input word.

20. The system of claim 18, wherein the compressor tree logic circuit comprises a Wallace-tree of 3:2 compressors and half-adders.

* * * * *